F. MEISSNER.
SHEARS AND SCISSORS.
APPLICATION FILED JAN. 22, 1908. RENEWED FEB. 23, 1910.
975,059.
Patented Nov. 8, 1910.
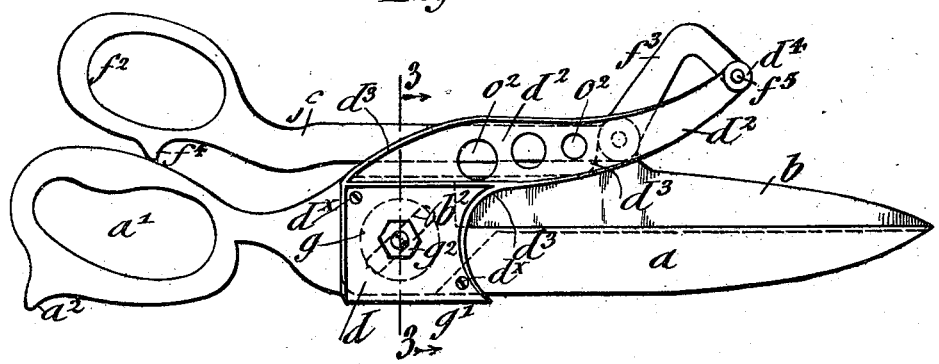
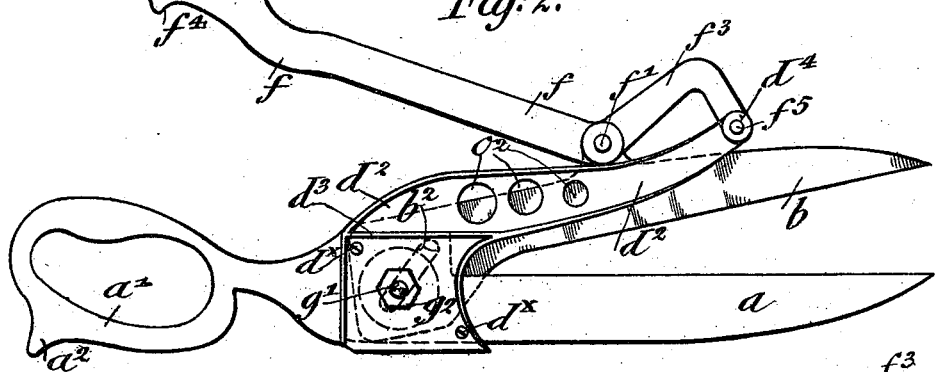
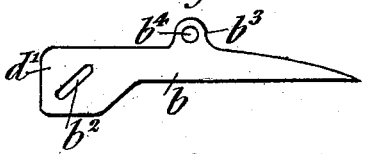
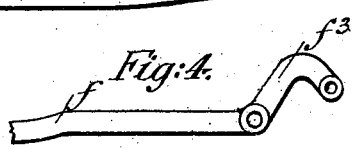
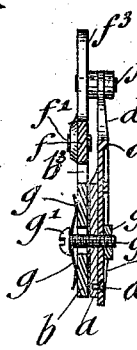
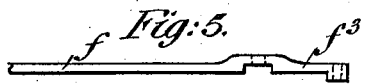
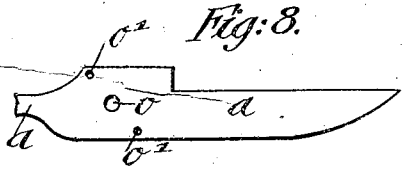
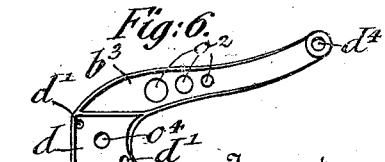

UNITED STATES PATENT OFFICE.

FRITZ MEISSNER, OF NEW YORK, N. Y.

SHEARS AND SCISSORS.

975,059. Specification of Letters Patent. Patented Nov. 8, 1910.

Application filed January 22, 1908, Serial No. 412,045. Renewed February 23, 1910. Serial No. 545,497.

*To all whom it may concern:*

Be it known that I, FRITZ MEISSNER, a citizen of the Empire of Germany, residing in New York, in the borough of Brooklyn, county of Kings, and State of New York, have invented certain new and useful Improvements in Shears and Scissors, of which the following is a specification.

This invention relates to an improvement in shears and scissors, in which by interposition of an intermediate lever mechanism the cutting power of the upper blade of the shears or scissors is considerably increased and thereby the force required for operating the shears or scissors considerably diminished, so that the same are especially adapted for the use of tailors and others who have to use heavy shears in cutting cloth and other fabrics.

This invention consists of a pair of shears or scissors which comprises a lower blade provided with a handle, an upper blade provided with a slot in its shank, a face-plate riveted to the lower blade and provided with a forwardly-extending supporting arm, a pivot-pin, connecting the face-plate with the lower blade and slotted portion of the upper blade, and a presser-lever that is pivoted to a lug on the upper blade and provided with a handle at its rear-end and with an elbow-shaped front-end that is pivoted to the outer end of the supporting arm of the face-plate so as to facilitate the working of the upper blade and the cutting action of the same.

The invention consists further of certain details of construction which will be fully described hereinafter and finally pointed out in the claims.

In the accompanying drawings, Figures 1 and 2 represent side-elevations of my improved shears or scissors, showing the upper blade respectively in closed and open position. Fig. 3 is a vertical transverse section on line 3, 3, Fig. 1. Figs. 4 and 5 are respectively a side-view and top-view of the presser-lever, and Figs. 6, 7 and 8 are respectively detail side-views of the face-plate and upper and lower blades of the shears or scissors.

Similar letters of reference indicate corresponding parts throughout the figures.

Referring to the drawings, $a$ represents the lower blade of my improved pair of shears or scissors which blade is provided with a handle $a^1$ of the usual shape, said handle being provided with a heel $a^2$ at its lower part. The lower edge of the blade $a$ rests on the table when the shears are used for cutting cloth or other fabrics. The lower blade $a$ is provided with a wider shank-portion $a^3$ which has a pivot-hole $o$ in the center for the passage of the pivot-pin for the upper blade $b$. The wider shank-portion of the lower blade $a$ is further provided, diagonally to the center-hole $o$, with holes $o^1$ for the rivets $d^x$ by which the lower portion of a supporting face-plate $d$ is attached to the shank of the lower blade $a$. The lower portion of the supporting-plate $d$ is likewise provided with holes $d^1$ which register with the holes $o^1$ in the shank of the lower blade. The face-plate $d$ is provided with a forwardly-extending and upwardly-curved arm $d^2$, which is made integral with the lower portion and which is preferably provided with openings $o^2$ of diminishing size so as to render the same lighter in weight, and with a raised rib $d^3$ that extends along the edges of the arm and lower portion so as to strengthen the same. The outer end of the arm $d^2$ is provided with a pivot-opening $d^4$.

The upper blade $b$ is cut off at its rear-portion and provided with a wider rear- or shank-portion $b^1$ in which is arranged a forwardly-inclined slot $b^2$, as shown clearly in Fig. 7. The upper blade $b$ is provided at or near its middle portion with an upwardly-extending lug $b^3$ having a pivot-hole $b^4$ so as to permit its connection by a pivot-pin $f^1$ with a presser-lever $f$ which is provided with a handle $f^2$ at its rear-end and with an angular or elbow-shaped arm $f^3$ at its front-end which arm is connected by a pivot-pin $f^5$ at its front-end with the front-end of the supporting-arm $d^2$ of the face-plate $d$. The handle $f^2$ of the presser-lever $f$ is provided with a heel $f^4$ which rests on the handle of the lower blade $a$, as usual in shears and scissors.

For regulating the pressure between the blades $a$ and $b$, a disk-shaped steel-spring $g$ is arranged between the shank of the upper blade $b$ and the head of a pivot-pin $g^1$, which passes through the inclined slot $b^2$ in the upper blade, the center-hole $o$ in the lower blade and a registering hole $o^4$ in the lower portion of the face-plate $d$, as shown in Fig. 3 and in dotted lines in Figs. 1 and 2. The pivot pin $g^1$ for the blades is provided with a nicked head adjacent to the spring $g$ and at the opposite end with a threaded end on which is screwed a nut $g^2$ so that the blades are tightly held together, while the pressure between the blades is regulated by the disk-spring $g$.

The operation of the shears or scissors is as follows: By lifting the handle of the presser-lever the upper blade is raised and guided by its inclined slot on the pivot-screw of the blades, as shown in Fig. 2. On lowering of the handle of the presser-lever the upper blade is quickly and forcibly moved down and drawn back toward the edge of the lower blade so as to cut off the cloth or other fabric by the quick and powerful cutting action of the upper blade against the edge of the lower blade. The increased leverage by which the presser-lever acts on the upper blade, exerts a greater force on the fabric to be cut while the working of the shears or scissors is rendered easier so that the workman can operate the shears or scissors for a longer time with less fatigue. By means of the presser-lever the opening and closing of the upper blade is facilitated and the cutting operation accelerated. The improved shears are specially adapted for tailors' use, but the construction is equally effective when applied to scissors.

Having thus described my invention, I claim as new and desire to secure by Letters Patent:

1. A pair of shears or scissors, consisting of a lower blade provided with a handle, an upper blade pivoted to the lower blade provided with an inclined slot in its shank, a face-plate attached to the lower blade and provided with a forwardly-extending supporting-arm, a pivot-screw connecting the blades and the lower portion of the face-plate, and a presser-lever provided with a handle at its rear-end and pivoted to the upper blade and the outer end of the supporting-arm of the face-plate.

2. A pair of shears or scissors, consisting of a lower blade provided with a handle, an upper blade pivoted to the lower blade and provided with an inclined slot, a face-plate attached to the lower blade and provided with a forwardly-extending supporting-arm, a pivot-screw connecting the blades and lower portion of the face-plate, and a presser-lever pivoted to the upper blade and provided with a handle at the rear-end and with an elbow-shaped front-end pivoted to the outer end of the supporting-arm of the face-plate.

3. A pair of shears or scissors, consisting of a lower blade provided with a handle, an upper blade having a wider shank-portion and a perforated lug at its middle portion, a face-plate riveted to the shank of the lower blade and provided with a forwardly-extending supporting-arm, a pivot-screw connecting the blades and the lower portion of the face-plate, and a presser-lever pivoted to the lug of the upper blade and provided with a handle at its rear-end and an angular or elbow-shaped front-arm at its front-end and a pivot-connection between the outer end of the supporting arm and the front-end of the presser-lever.

4. A pair of shears or scissors, consisting of a lower blade provided with a handle, an upper blade having a wider shank-portion and provided with an inclined slot, a face-plate riveted to the lower blade and provided with a forwardly-extending supporting-arm, a pivot-screw passing through the inclined slot of the upper blade and registering holes in the lower blade and lower portion of the face-plate, said pivot-screw being provided with means for regulating the pressure between the blades, and a presser-lever provided with a handle at its rear-end and an angular or elbow-shaped arm at its front-end, said lever being pivoted to a perforated lug on the upper blade and at its front-end to the outer end of the supporting arm of the face-plate.

In testimony, that I claim the foregoing as my invention, I have signed my name in presence of two subscribing witnesses.

FRITZ MEISSNER.

Witnesses:
PAUL GOEPEL,
HENRY J. SUHRBIER.